United States Patent [19]
Waschinski et al.

[11] Patent Number: 5,384,169
[45] Date of Patent: Jan. 24, 1995

[54] PROCESS FOR THE PREPARATION OF CLOSURES FOR PACKAGING CONTAINERS

[75] Inventors: Klaus-Markus Waschinski, Senden; Arno Schmitz, Nottuln; Ute Rübartsch, Dülmen, all of Germany

[73] Assignee: BASF Lacke + Farben Aktiengesellschaft, Munster, Germany

[21] Appl. No.: 743,287

[22] PCT Filed: Jan. 25, 1990

[86] PCT No.: PCT/EP90/00136
§ 371 Date: Sep. 27, 1991
§ 102(e) Date: Sep. 27, 1991

[87] PCT Pub. No.: WO90/10041
PCT Pub. Date: Sep. 7, 1990

[30] Foreign Application Priority Data
Feb. 23, 1989 [DE] Germany ............... 3905545

[51] Int. Cl.$^6$ ............... B29D 22/00; B32B 31/00
[52] U.S. Cl. ............... 428/34.1; 428/35.7; 428/355; 206/813; 220/359; 156/182; 156/275.3; 156/275.7; 156/308.4; 156/331.7
[58] Field of Search ............... 528/45, 49, 60, 78, 528/62, 64, 69, 71, 73, 902; 428/35.7, 35.2, 355, 423.1; 524/724, 765, 789; 53/397, 410, 416, 420, 471, 287; 206/813; 220/359; 156/182, 272.2, 275.5, 275.3, 275.7, 278, 308.4, 331.7

[56] References Cited
U.S. PATENT DOCUMENTS

| | | | |
|---|---|---|---|
| 4,348,511 | 9/1982 | Haug | 528/72 |
| 4,595,445 | 6/1986 | Hombach et al. | 156/307.3 |
| 4,619,985 | 10/1986 | Hess et al. | 528/49 |
| 4,716,182 | 12/1987 | Hess et al. | 521/163 |
| 4,935,484 | 6/1990 | Pedain et al. | 528/45 |
| 5,055,542 | 10/1991 | Hönel et al. | 528/45 |
| 5,126,424 | 6/1992 | Brindöpke et al. | 528/45 |

FOREIGN PATENT DOCUMENTS

| | | |
|---|---|---|
| 59-131669 | 7/1984 | Japan. |
| 63-156879 | 6/1988 | Japan. |
| 2167426 | 5/1986 | United Kingdom. |

*Primary Examiner*—Charles R. Nold
*Attorney, Agent, or Firm*—Anne Gerry Sabourin

[57] ABSTRACT

The present invention relates to a process for the preparation of closures for imperviously sealing packaging containers, by which a sealing composition is applied and stoved onto the inside of the closures, wherein the sealing composition contains A) 65 to 93% by weight of a liquid, blocked diisocyanate
B) 2 to 15% by weight of a liquid diamine and/or polyamine
C) 0 to 25% by weight of pigments and/or fillers
D) 0 to 20% by weight of one or more reactive diluents
E) 0 to 8% by weight of auxiliaries and additives, where the sum of the proportions by weight of the components A to E is 100% by weight in each case.

The present invention furthermore relates to the closures prepared by the process according to the invention and also to packaging containers which contain these closures.

13 Claims, No Drawings

PROCESS FOR THE PREPARATION OF CLOSURES FOR PACKAGING CONTAINERS

The present invention relates to a process for the preparation of closures for imperviously sealing packaging containers, by which a sealing composition is applied and stoved onto the inside of the closures.

The invention furthermore relates to closures for packaging containers, where a sealing composition has been applied and stored onto the inside of the said closures, and also relates to packaging containers with these closures.

The purpose of the various packaging materials is to hermetically seal the contents from the environment and to do this also under extreme conditions such as, for example, those prevailing when heat-sterilizing foodstuffs. Isolation of the contents from the environment is ensured by introducing suitable sealing compositions to the lid and closures with which the packaging container is sealed. Commercially, i.e. economically, attractive sealing compositions for closures must have a number of critical properties and are therefore highly specialized materials and compositions. The required properties of the sealing compositions are moreover also determined to some extent by the intended use of the packagings.

With foodstuffs packagings, for instance, particular importance attaches to the resistance of the sealing compositions to the contents during sterilization or pasteurization and also during storage of the packaged foodstuffs for a period often extending to years. In the case of industrial packagings, the contents are often chemically highly reactive or agressive, and the sealing compositions must likewise be resistant to these contents. Normally, for closures and lids of glass and metal packagings, sealing compositions made from plasticizer-containing PVC plastisols are used, as described in the case of closures for glass jars in DE-B-2,003,693 for example. As a rule, the PVC plastisols used as a sealing composition are composed of a paste-making polyvinyl chloride which has in particular a defined swelling power in plasticizer, and of one or more plasticizers and optional fillers, stabilizers, pigments and polyvinyl chloride processing auxiliaries.

The formulation of plasticizer-containing PVC plastisols, their preparation and processing, is substantially described in K. Weinmann, Beschichten mit Lacken und Kunststoffen, 1967, published by Verlag W.A. Colomb, Stuttgart.

It is known that with PVC sealing compositions of this type exposed to contents, in particular fatty and oily substances, and thermal stress (pasteurization, sterilization), it is basically impossible to prevent plasticizer migration from the sealing composition and also partial dissolving and swelling of the sealing composition where solvent-containing contents are concerned. The magnitude of the plasticizer migration can exceed foodstuffs regulations which are current or under discussion. Furthermore, under certain circumstances, the plasticizer migration can result in a loss of vacuum in pasteurized and sterilized packagings and also a loss of solvents due to increased gas permeability where industrial packagings are concerned. With industrial packagings, there is likewise basically the problem of contamination of the contents due to the plasticizer migration and swelling or partial dissolving of the polyvinyl chloride. A further disadvantage of these sealing compositions is that the disposal of PVC-containing waste materials is becoming increasingly difficult and cost intensive. However, in addition to the customarily used PVC sealing compositions there are also sealing compositions based on polyurethane. For instance, U.S. Pat. No. 3,971,785 and GB-B-1,374,745 describe sealing compositions for packaging containers, which comprise blocked or unblocked polyisocyanate prepolymers and, as crosslinking agents, carbon dioxide-blocked amines. DE-A-1,957,827 and DE-A-2,203,730 disclose sealing compositions comprising hydroxyl-containing polymers and polyisocyanates or blocked prepolymers and also an activator with hydroxyl-containing polymers and aluminum silicate compounds.

The object of the present invention was therefore to provide a process for the preparation of closures for imperviously sealing packaging containers whose closures have sealing compositions applied with their insides which, in comparison with the customarily used sealing compositions based on PVC plastisols, have no plasticizer migration and the least possible migration of other components of the sealing material into the contents. In the case of foodstuffs packagings, the sealing composition must therefore be resistant particularly under conditions of sterilization and pasteurization and not migrate into the contents. In the case of industrial packagings, chemical resistance is particularly required.

At the same time, the process must be as simple as possible and must be feasible at only slight expense. It must be possible for instance to process the process compositions on the same plant which is used to process the prior art PVC plastisols. Trouble-free manipulation must be ensured by having a solvent-free thermoreactive 1-component system with a good shelf life. Finally, the sealing composition must also have good adhesion to the closure which may or may not have a coating of the type typically used in the packaging industry.

This object is surprisingly achieved by a process for the preparation of closures for imperviously sealing packaging containers whose closures have a sealing composition applied and stoved onto the inside. The process is one wherein the sealing composition contains A) 65 to 93% by weight of a liquid, blocked diisocyanate
B) 2 to 15% by weight of a liquid diamine and/or polyamine
C) 0 to 25% by weight of pigments and/or fillers
D) 0 to 20% by weight of one or more reactive diluents
E) 0 to 8% by weight of auxiliaries and additives, where the sum of the proportions by weight of the components A to E is 100% by weight in each case. The present invention accordingly also provides closures prepared by the process according to the invention and packaging containers containing these closures.

Now, although DE-A-1,644,813 discloses stoving paints whose formation is likewise based on blocked toluylene diisocyanate and amine crosslinking agents, this publication gives no indication that the stoving paints are suitable for use as a sealing composition. Neither do those skilled in the art receive any guidance for achieving the object of the present invention. On the contrary, DE-OS-1,644,813 has the object of providing a process for the preparation of paint solutions with a long shelf life.

Furthermore, the product data sheet "Desmodur ® BL 1100" from Bayer AG discloses that with this isocyanate "Desmodur ® BL 1100", a liquid, blocked aromatic polyisocyanate, in combination with cycloaliphatic diamines as coreactants, it is possible to obtain films with rubber-elastic properties. However, this publication neither gives any guidance for the use of systems of this type as sealing compositions in the preparation of closures for packaging containers nor guidance to the average person skilled in the art for achieving the object of the present invention. On the contrary, the poor solvent resistance of the coating, which is referred to in this publication, precludes the use of such systems as sealing compositions for closures of packaging containers.

In what follows, first the sealing compositions used in the process according to the invention will be described. Suitable components A for the sealing compositions are all those blocked diisocyanates which are liquid at room temperature. It must additionally be ensured that, in the case of foodstuffs packagings, no contamination of the contents occurs due to residues of the blocking agent which may still be present and migration of these residues into the contents.

Examples of suitable blocking agents for the component A are lactams such as, for example, $\epsilon$-caprolactam, $\delta$-valerolactam, oximes such as, for example, acetone oxime, diethyl ketoxime, acetophenone oxime, cyclohexanone oxime, cyclopentanone oxime, methyl ethyl ketoxime, butanone oxime, benzophenone oxime, formaldoxime, acetaldoxime and also phenols. Preference is given to the use of caprolactams, in particular $\epsilon$-caprolactam.

Suitable isocyanate components are all those diisocyanates which are liquid in blocked form having fully reacted with one of the above blocking agents, and which give systems having shore A hardnesses (DIN 53 505) of preferably between 20 and 80. Examples of suitable diisocyanates are 2,4- and 2,6-toluylene diisocyanate and mixtures of these isomers.

The component A is used in the sealing compositions in an amount from 65 to 93% by weight, preferably 70 to 90% by weight, relative in each case to the total composition.

A suitable crosslinking agent for the blocked isocyanates (component B), used in an amount from 2 to 15% by weight, preferably 6 to 12% by weight, relative in each case to the total composition, comprises liquid diamines and/or polyamines, in particular liquid cycloaliphatic diamines, such as for example 4,4-diamino-3,3-dimethyldicyclohexylmethane, 4,4-diaminodicyclohexylmethane, polyoxypropylenetriamine with an average molecular weight $M_w$ of 400 to 450 and also liquid polyaminoamides such as, for example, the commercial product "Versamide 100" from Schering AG and liquid polyamino amides which are prepared by condensation of dimeric and trimeric fatty acids with aliphatic amines. The amino groups of the amino compounds used are primary and/or secondary amino groups.

Other components of the sealing compositions are 0 to 25% by weight, preferably 0 to 20% by weight, relative in each case to the total composition, of pigments and/or fillers such as, for example, titanium dioxide, synthetic iron oxides, organic pigments such as for example phthalocyanines, tartrazines, ultramarine blue, Pigment Yellow 83, Pigment Orange 43, Pigment Orange 5, Pigment Red 4 and also magnesium silicates and aluminum silicates, amorphous and pyrogenic silica, barium sulfate, carbon black, talc, kaolin and chalk. A favorable viscosity for the application can be arrived at by incorporating into the sealing compositions a further 0 to 20% by weight, preferably 0 to 10% by weight, relative in each case to the total composition, of one or more reactive diluents (component D). Examples of suitable compounds are polyols such as for example propylene glycol and diethylene glycol.

Finally, the sealing compositions used according to the invention may also contain 0 to 8% by weight, relative to the total composition, of other auxiliaries and additives (component E). Examples of these are lubricants for giving the correct torque to closures which have to be screwed open or twisted open. Suitable lubricants include fatty acids such as stearic acid and oleic acid, silicone oils such as dimethylpolysiloxane and methyl hydrogen polysiloxane. Other substances used as component E are waxes and silicas for achieving certain flow properties and, in the case of expanded sealing compositions, blowing agents such as for example azodicarbonamides or sulfohydrazides.

Owing to their higher elasticity in comparison with unexpanded sealing compositions, expanded sealing compositions are used in bucket lids, drum lids and hobbock lids, while for glass jars and bottle closures the sealing compositions are generally unexpanded. Generally, the foaming of the sealing compositions brings about a reduction of the Shore A hardness (measured in accordance with DIN 53 505), an increase in flexibility, an increase in volume and the achievement of an enhanced sealing action due to an improved deformability.

The preparation of the sealing compositions is carried out by mixing the individual components and here it may be preferred to add the insoluble ingredients, for example pigments, to the component A initially and to disperse them, as necessary, using the dispersing machines customarily used in the paint industry. When preparing unexpanded sealing compositions, the mixing or dispersion is normally carried out in vacuo. The sealing compositions prepared by this method generally have Shore A hardnesses (DIN 53 505) of between 20 and 80, preferably between 25 and 70.

The amount of the sealing compositions applied depends on the geometry of the closure component, on the intended use of the packaging and also on whether or not the sealing composition is expanded.

The preparation of the closures by the process according to the invention is carried out by applying the sealing compositions described above to the inside of the closures, preferably using the known inflow process. In this process, the sealing composition is pressed or injected at slightly elevated temperature, usually about 40° C., in the uncured paste-like condition from one or more nozzles into the closure components which are supported on a suction cup or the like with the inner surface facing upward and set in high speed rotational motion. Owing to centrifugal forces, the sealing composition is brought into the desired contour and shape. After this inflow has ended, curing of the sealing compositions takes place at temperatures of between 170° C. and 190° C. during a drying time of 2 to 10 min. The drying and the equipment used for it are also known and therefore do not need to be described in more detail here.

The closure to be coated with the sealing composition is to be understood as meaning all the components of the packaging material which are connected to the body of the packagings, for example crown corks, for example in beer bottles, fruit Juice bottles and soft drink bottles, closures for bottles and glass jars and also other closures normally used in the packaging industry for cans, buckets, drums and so on.

These closures can be made from metals such as aluminum, tin-free steel, tinplate and various iron alloys which may optionally be given a passivating coating based on nickel compounds, chromium compounds and zink compounds. The sealing composition can be applied by the process according to the invention to uncoated or coated closures. Suitable coatings are paints based on epoxy-phenolic resins, acrylic resins, polyesters or organosols such as are customary in the packaging industry. However, these paints are known (cf. for example H. Kittel, Lehrbuch der Lacke und Beschichtungen, Band IV, Lack- und Beschichtungssysteme, Formulierung, Verlag W. A., Colomb in der H. Heenemann GmbH, Berlin-Oberschwandorf 1976) and therefore do not need to be described in greater detail here.

In addition to the one-coat finishes, in particular for contents containing acid and for packaging meat, two-coat finishes are also used having a base coat based on epoxy-phenolic resin and a top coat based on an organosol, a polyester or an acrylate.

The coatings prepared by the process according to the invention have the particular advantage that the sealing compositions, in comparison with the conventional PVC sealing compositions, do not give rise to any plasticizer migration and have good solvent resistance and chemical resistance, good resistance under pasteurization and sterilization conditions and also good adhesion to conventional coated substrates and in particular to conventional uncoated substrates.

The invention is described in more detail below using exemplary embodiments. Unless explicitly stated otherwise, all parts and percentages are by weight.

First, the sealing compositions A to F are prepared from the components given in Table 1. From these sealing compositions A to F, the viscosity (in accordance with DIN standard 53 211) is measured using a 8 mm DIN flow cup and the Shore A hardness (DIN standard 53 505) is measured from test specimens. The results of these investigations are also given in Table 1.

Examination of the migration behavior of the sealing compositions according to the invention in comparison with sealing compositions based on PVC plastisols was carried out by initially applying the sealing composition E to sheet metal in a layer thickness corresponding to the normal rate of application to closures (cf. Tables 6 to 14) and curing the film for 5 min. at 190° C. The migration tests were carried out by bringing 1 cm$^2$ of surface of the coating composition into contact with 2 ml of the test solution in each case. The migrating amounts of foreign substances were determined in total in the form of the dry residues. The cloroform-soluble component of the dry residues was also determined. The results of these investigations are given in Table 3. The migrated substances were furthermore investigated qualitatively and quantitatively for organically bound nitrogen, phenol, formaldehyde and heavy metals. The results are compiled in Table 4.

In addition, a sensory test was carried out by allowing 10 ml or 2 ml volumes of different test solutions (mains water, mineral water, apple juice) to react in each case with 1 cm$^2$ of surface of the sealing composition under the conditions given in Table 4. The test solutions were independently examined by several examiners by the triangle test in comparison with blank solutions which had not been in contact with the sealing material. The assessment was made in accordance with DIN 10 955. The test results are given in Table 5.

As a comparison, the sealing composition V based on a plasticizer-containing PVC plastisol was also examined similarly to the sealing compositions A to E. The composition of this sealing composition V is given in Table 2 and the test results are given in Tables 3 to 5. Furthermore, the sealing compositions were also examined with regard to their resistance, adhesion properties and sealing effects when used in crown corks (cf. Tables 6 and 7), bottle screw tops (cf. Table 8), glass jar closures (cf. Tables 9 and 10), hobbock lids (cf. Tables 11 and 12), bucket lids (cf. Tables 13 and 14) and drum lids (cf. Table 15) under different stresses (for example sterilization). For this purpose, the sealing composition is initially applied in the given amount in each case using an automatic injection machine customarily employed in the packaging container industry and dried for 5 min. at 190° C. Testing of the properties in the case of foodstuffs packagings is carried out by filling each container (bottles, glass Jars and so on, depending on the closure component) with different test solutions (water, 3% strength sodium chloride solution, 2% strength sodium chloride and 3% strength acetic acid solution, 1% strength and 2% strength lactic acid solution, 4% strength oxalic acid solution and a solution of 0.5 g of cysteine in 1 l of water) and sterilizing the containers for 45 min. at 125° C. Then the resistance of the sealing composition, its adhesion and sealing action are investigated and assessed. Industrial contents were simulated by filling the packagings with methyl ethyl ketone, trichloroethylene, methylene chloride and ethanol and storing the sealed containers at room temperature for 3 months. Then the industrial properties of the sealing composition were examined.

The individual test methods are now described in more detail below:

Adhesion test

A small slit was made in the sealing composition and an attempt was made to remove the sealing composition manually:

good adhesion, sealing composition only removable with destruction serviceable adhesion: sealing composition removable as a ring or in sections with great effort (high resistance)

poor adhesion: easy removal of the sealing composition from the coated or uncoated closure Test for sealing action A check is made to see whether, after the stress test, the vacuum has been retained and whether the contents come out.

Test of condition

An assessment is made of whether the sealing composition has remained serviceable and/or whether it is brittle, crazed or swollen, or whether the substrate (sheet metal) is visible.

TABLE 1

| | Sealing compositions examined | | | | | |
|---|---|---|---|---|---|---|
| | A | B | C | D | E | F |
| Isocyanate[1] | 92 | 92 | 74.5 | 76 | 69.6 | 68.2 |
| Polyamine[2] | 8 | 7 | 6 | 6 | 5.5 | 5.4 |
| Titanium dioxide | — | — | 0.8 | 0.8 | 0.7 | 0.7 |
| Barium sulfate | — | — | 7.3 | 7.6 | 7.0 | 6.9 |
| Aluminum silicate | — | — | 7.4 | 8.6 | 8.0 | 7.8 |
| Dimethylpoly-siloxane ($M_w$ > 100) | — | — | 4 | — | — | 2.0 |
| Azodicarbonamide | — | 1 | — | 1.0 | — | — |

TABLE 1-continued

| | Sealing compositions examined | | | | | |
|---|---|---|---|---|---|---|
| | A | B | C | D | E | F |
| 50% strength in propyleneglycol | | | | | | |
| Propylene glycol | — | — | — | — | 9.2 | 9.0 |
| Viscosity (s)[3] | 110 | 100 | 130 | 130 | 50 | 50 |
| Shore hardness | 55 | 30–35 | 65 | 35 | 50–55 | 50–55 |

[1] = ε-Caprolactam-blocked Toluylene diisocyanate
[2] = 4,4 Diamino-3,3-dimethyldicyclohexylmethane
[3] = measured in 8 mm DIN cup at 40° C.

TABLE 2

Composition of a sealing composition V based on a plasticizer-containing

| | |
|---|---|
| 43.0 pts | Polyvinyl chloride (PVC) with a K-value of 70[1] |
| 7.7 pts | Dioctyl phthalate |
| 31.5 pts | Epoxidized soya bean oil |
| 1.5 pts | Octyl ester of a fatty acid |
| 1.0 pts | Titanium dioxide |
| 8.8 pts | Barium sulfate |
| 3.1 pts | Aluminum silicate |
| 0.4 pts | Calcium stearate/zinc stearate |
| 1.7 pts | Fatty acid amide |
| 1.3 pts | Silicon oil |

[1] determined in accordance with DIN 53 726

TABLE 3

Results of the migration tests

| | Sealing composition V | | Sealing composition E | |
|---|---|---|---|---|
| | TR[1] | CA[2] | TR | CA |
| dist. Water 10 d 40° C. | 4.4 | 1.4 | 15.1 | 4.1 |
| 3% strength acetate acid soln 10 d 40° C. | 3.5 | 1.3 | 7.7 | 4.3 |
| 15% strength ethanol soln 10 d 40° C. | 3.2 | 1.9 | 38.8 | 8.2 |
| n-Heptane 2 h/50° C. | — | — | 53.1 | 17.4 |
| 2 h/65° C. | 778 | 761 | — | — |

[1] TR: Dry residue of migrated material (mg/100 cm²)
[2] CA: Chloroform-soluble component of the dry residue (mg/100 cm²)

TABLE 4

Examination of the migrated material

| Substance analyzed for | Test solution | Sealing composition V | E |
|---|---|---|---|
| org. bound Nitrogen (mg/100 cm²) | dist. Water | 0.16 | 1.8 |
| | 3% strength acetic acid soln | 0.15 | 2.3 |
| | 15% strength ethanol soln | 0.13 | 1.5 |

TABLE 4-continued

Examination of the migrated material

| Substance analyzed for | Test solution | Sealing composition V | E |
|---|---|---|---|
| Phenol | dist. Water | n.d[1] | n.d. |
| | 3% strength acetic acid soln | n.d. | n.d. |
| Formaldehyde | dist. Water | n.d. | n.d. |
| | 3% strength acetic acid soln | n.d. | n.d. |
| Lead, Arsenic, Antimony | dist. Water | n.d. | n.d. |
| | 3% strength acetic acid soln | n.d. | n.d. |
| Zinc | dist. Water | n.d. | n.d. |
| | 3% strength acetic acid soln | 0.07 | n.d. | n.d. = not detectable

TABLE 5

Results of the sensory test

| Sealing composition | | V | A | B | C | D | E | F |
|---|---|---|---|---|---|---|---|---|
| Mains water 10 d 40° C. | Appearance | 0/0 | 0/0 | 0/0 | 0/0 | 0/0 | 0/0 | 0/0 |
| | Odor | 0/0 | 0/0 | 0/0 | 0/0 | 0/0 | 0/0 | 0/0 |
| | Taste | 0/0 | 0/0 | 0/0 | 0/0 | 0/0 | 0/0 | 0/0 |
| Mineral water 10 d 40° C. | Appearance | 0/0 | 0/0 | 0/0 | 0/0 | 0/0 | 0/0 | 0/0 |
| | Odor | 0/0 | 0/0 | 0/0 | 0/0 | 0/0 | 0/0 | 0/0 |
| | Taste | 0/0 | 0/0 | 0/0 | 0/0 | 0/0 | 0/0 | 0/0 |
| Apple juice 2 h 50° C. | Appearance | 0/0 | 0/0 | 0/0 | 0/0 | 0/0 | 0/0 | 0/0 |
| | Odor | 0/0 | 0/0 | 0/0 | 0/0 | 0/0 | 0/0 | 0/0 |
| | Taste | 0/0 | 0/0 | 0/0 | 0/0 | 0/0 | 0/0 | 0/0 |

0 = no discernible change; 1 = change just discernible
2 = slight change  3 = significant change  4 = pronounced change
first value quoted: 10 ml Test Solution cm², second value quoted = 2 ml Test Solution/cm²

TABLE 6

Properties of the sealing compositions on crown corks after pasteurization (30 min, 90° C.)

| Example | 1 | 2 | 3 | 4 | 5 | 6 |
|---|---|---|---|---|---|---|
| Sealing composition | B | B | B | B | B | B |
| Substrate | ECCS[1] | ECCS | ECCS | TP[2] | TP | TP |
| Primer | uncoated | EP[3] | 0[4] | uncoated | EP | 0 |
| Layer of sealing composition (g) | 0.5 | 0.5 | 0.5 | 0.5 | 0.5 | 0.5 |
| Condition | O.K. | O.K. | O.K. | O.K. | O.K. | O.K. |
| Adhesion | good | good | good | good | good | good |
| Vacuum | O.K.[5] | O.K. | O.K. | O.K. | O.K. | O.K. |

[1] ECCS = Electrolytically chromium - plated steel
[2] TP = tin plated = tinplate E 2.8/2.8 (DIN 1616)
[3] EP = Epoxy-phenolic-resin-based primer
[4] 0 = Organosol primer
[5] O.K. = serviceable

TABLE 7

Properties of the sealing composition D on crown corks after pasteurization (30 min, 90° C.)

| Example | 7 | 8 | 9 | 10 | 11 | 12 |
|---|---|---|---|---|---|---|
| Sealing composition | D | D | D | D | D | D |
| Substrate | ECCS[1] | ECCS | ECCS | TP[2] | TP | TP |
| Primer | uncoated | EP[3] | 0[4] | uncoated | EP | 0 |
| Layer of sealing composition (g) | 0.5 | 0.5 | 0.5 | 0.5 | 0.5 | 0.5 |
| Condition | O.K. | O.K. | O.K. | O.K. | O.K. | O.K. |
| Adhesion | good | good | good | good | good | good |

TABLE 7-continued

Properties of the sealing composition D on crown corks after pasteurization (30 min, 90° C.)

| Example | 7 | 8 | 9 | 10 | 11 | 12 |
|---|---|---|---|---|---|---|
| Vacuum | O.K.[5] | O.K. | O.K. | O.K. | O.K. | O.K. |

[1]ECCS = Electrolytically chromium-plated steel
[2]TP = tin plated = tinplate E 2.8/2.8 (DIN 1616)
[3]EP = Epoxy-phenolic-resin-based primer
[4]O = Organosol primer
[5]O.K. = serviceable

TABLE 8

Properties of the sealing compositions on bottle screw-tops after pasteurization (30 min, 95° C.)

| Example | 13 | 14 | 15 | 16 |
|---|---|---|---|---|
| Sealing composition | C | C | F | F |
| Substrate | Aluminum | Aluminum | Aluminum | Aluminum |
| Primer | O[1] | 2 S[2] | 0 | 2S |
| Layer of sealing composition (g) | 0.5 | 0.5 | 0.5 | 0.5 |
| Condition | O.K.[3] | O.K. | O.K. | O.K. |
| Adhesion | good | good | good | good |
| Vacuum | O.K.[5] | O.K. | O.K. | O.K. |

[1]O = Organosol primer
[2]2S = 2-coat finish: Base coat: Epoxy-phenolic-resin-based paint, top coat Organosol
[3]O.K. = serviceable

TABLE 9

Properties of the sealing compositions on glass jar closures after sterilization (45 min, 125° C.)

| Example | 17 | 18 | 19 | 20 | 21 | 22 |
|---|---|---|---|---|---|---|
| Sealing composition | C | C | C | C | C | C |
| Substrate | TFS[1] | TFS | TP[2] | TP | Al[3] | Al |
| Primer | O[4] | 2S[5] | 0 | 2S | 0 | 2S |
| Layer of sealing composition (g) | | | | | | |
| 65 mm diam. | 1.0 | 1.0 | 1.0 | 1.0 | 1.0 | 1.0 |
| 76 mm diam. | 1.5 | 1.5 | 1.5 | 1.5 | 1.5 | 1.5 |
| Condition | O.K.[6] | O.K. | O.K. | O.K. | O.K. | O.K. |
| Adhesion | good | good | good | good | good | good |
| Vacuum | O.K. | O.K. | O.K. | O.K. | O.K. | O.K. |

[1]TFS = tin free steel
[2]TP = tin plated = white paint [sic] E 2.8/2.8 (DIN 1616)
[3]Al = Aluminum
[4]0 = Organosol primer
[5]2 S = 2-coat finish: Base coat: Epoxy-phenolic-resin-based-paint; top coat = Organosol
[6]O.K. = serviceable

TABLE 10

Properties of the sealing compositions on glass jar closures after sterilization (45 min, 125° C.)

| Example | 23 | 24 | 25 | 26 | 27 | 28 | 29 | 30 | 31 |
|---|---|---|---|---|---|---|---|---|---|
| Sealing composition | E | E | E | E | E | E | F | F | F |
| Substrate | TFS[1] | TFS | TP[2] | TP | Al[3] | Al | TFS | TP | Al |
| Primer | O[4] | 2 S[5] | 0 | 2S | 0 | 2S | 2S | 2S | 2S |
| Layer of sealing composition (g) | | | | | | | | | |
| 65 mm diam. | 1.0 | 1.0 | 1.0 | 1.0 | 1.0 | 1.0 | 1.0 | 1.0 | |
| 76 mm diam. | 1.5 | 1.5 | 1.5 | 1.5 | 1.5 | 1.5 | 1.5 | 1.5 | |
| Condition | O.K.[6] | O.K. | O.K. | O.K. | O.K. | O.K. | O.K. | O.K. | |
| Adhesion | good | good | good | good | good | good | good | good | |
| Vacuum | O.K. | O.K. | O.K. | O.K. | O.K. | O.K. | O.K. | O.K. | |

[1]TFS = tin free steel
[2]TP = tin plated = white paint [sic] E 2.8/2.8 (DIN 1616)
[3]Al = Aluminum
[4]0 = Organosol primer
[5]2 S = 2-coat finish: Base coat: Epoxy-phenolic-resin-based paint; top coat = Organosol
[6]O.K. = serviceable

TABLE 11

Properties of the sealing compositions on Hobbock lids (diam. 34.5 cm) after storage with industrial contents

| Example | 32 | 33 | 34 | 35 |
|---|---|---|---|---|
| Sealing composition | B | B | B | B |
| Substrate | EECS[1] | EECS | TP[2] | TP |
| Primer | uncoated | EP[3] | uncoated | EP |
| Layer of sealing composition (g) | 12 | 12 | 12 | 12 |
| Condition | O.K.[4] | O.K. | O.K. | O.K. |
| Adhesion | good | good | good | good |

[1]ECCS = Electrolytically chromium-plated steel
[2]TP = tin plated = tinplate E 2.8/2.8 (DIN 1616)
[3]EP = Epoxy-phenolic-resin-based primer
[4]O.K. = serviceable

TABLE 12

Properties of the sealing composition D on Hobbock lids (diam. 34.5 cm) after storage with industrial contents

| Example | 36 | 37 | 38 | 39 |
|---|---|---|---|---|
| Sealing composition | D | D | D | D |
| Substrate | ECCS[1] | ECCS | TP[2] | TP |
| Primer | uncoated | EP[3] | uncoated | EP |
| Layer of sealing composition (g) | 12 | 12 | 12 | 12 |
| Condition | O.K.[4] | O.K. | O.K. | O.K. |
| Adhesion | good | good | good | good |

[1]ECCS = Electrolytically chromium-plated steel
[2]TP = tin plated = tinplate E 2.8/2.8 (DIN 1616)
[3]EP = Epoxy-phenolic-resin-based primer
[4]O.K. = serviceable

TABLE 13

Properties of the sealing composition B on bucket lids (diam. 24 cm)

| Example | 40 | 41 | 42 | 43 |
|---|---|---|---|---|
| Sealing composition | B | B | B | B |
| Substrate | TP[1] | TP | TP | TP |
| Primer | uncoated | uncoated | EP[2] | EP |
| Layer of sealing composition (g) | 7 | 7 | 7 | 7 |
| Contents | ind. | ind. | LM[3] | LM |
| Condition | O.K.[4] | O.K. | O.K. | O.K. |
| Adhesion | good | good | good | good |

[1]TP = tin plated = tinplate E 2.8/2.8 (DIN 1616)
[2]EP = Epoxy-phenolic-resin-based primer
[3]LM = foodstuffs
[4]O.K. = serviceable

TABLE 14

Properties of the sealing composition D on bucket lids (diam. 24 cm) after storage with industrial contents

| Example | 44 | 45 | 46 | 47 |
|---|---|---|---|---|
| Sealing composition | D | D | D | D |
| Substrate | TP[1] | TP | TP | TP |
| Primer | uncoated | uncoated | EP[2] | EP |
| Layer of sealing composition (g) | 7 | 7 | 7 | 7 |
| Contents | ind. | ind. | LM[3] | LM |
| Condition | O.K.[4] | O.K. | O.K. | O.K. |
| Adhesion | good | good | good | good |

[1] TP = tin plated = tinplate E 2.8/2.8 (DIN 1616)
[2] EP = Epoxy-phenolic-resin-based primer
[3] LM = Foodstuffs
[4] O.K. = Serviceable
[1] TP = tin plated = tinplate E 2.8/2.8 (DIN 1616)
[2] EP = Epoxy-phenolic-resin-based primer
[3] LM = foodstuffs
[4] O.K. = serviceable

TABLE 15

Properties of sealing compositions on drum lids (diam. 6.0 cm)

| Example | 48 | 49 | 50 | 51 |
|---|---|---|---|---|
| Sealing composition | B | B | D | D |
| Substrate | TFS[1] | TFS | TFS | TFS |
| Primer | uncoated | EP[2] | uncoated | EP |
| Layer of sealing composition (g) | 160 | 160 | 160 | 160 |
| Condition | O.K.[3] | O.K. | O.K. | O.K. |
| Adhesion | good | good | good | good |

[1] TFS = tin free steel
[2] EP = Epoxy-phenolic-resin-based primer
[3] O.K. = serviceable Summary of the results of the investigation The qualitative and quantitative examination of the migrated material with regard to the specific migration gave no indication with respect to organically bound nitrogen, phenol, formaldehyde and heavy metals of toxic components and consequently indicated suitability of the sealing compositions for use in foodstuffs packagings. In contrast to sealing compositions based on PVC plastisol, no leaching of plasticizer occurs (the sealing compositions A to F contain no plasticizer) due to the effects of fats and oils (simulated by n-heptane) so that the sealing action is also unimpaired with contents of this type, in contrast to the prior art sealing compositions V. The results of the sensory test establish that on using the sealing compositions in foodstuffs packagings no changes in odor and taste are to be expected which might impair the aqueous, acid or weakly alcoholic contents. The test carried out under the action of 2 ml of test solution per cm² of surface of the sealing composition is actually a very much higher stress than would be encountered in practice in the intended use for the sealing composition and yet under these conditions no smell or taste effects on the test solutions were observed. Furthermore, under the test conditions no opacifying substances or colorants were released into the test solutions used.

The practical test of the sealing compositions on the various closure components (crown corks, glass jar closures, hobbock lids, bucket lids, drum lids and bottle screwtops) under different stresses—simulating those stresses encountered in the application as packagings for foodstuffs and industrial contents—likewise produced excellent results. The simulation of the stresses in the case of foodstuffs packagings by heating filled packagings containing different aqueous solutions and subsequently assessing the sealing compositions demonstrated an excellent sealing action without losses under the stress combined with good adhesion properties. Moreover, the sealing compositions, on being placed under stress from reactive contents such as for example solvents and oils, have an extremely high resistance to these materials. In contrast to plasticizer-containing sealing compositions based on PVC plastisols the sealing action and the elasticity of the sealing compositions according to the invention remain intact despite the effects of these reactive substances, this being due to the high resistance described above.

We claim:

1. A process for the preparation of a closure for imperviously sealing a packaging container comprising the steps of applying a sealing composition onto the inside of the closure and stoving the sealing composition, wherein the sealing composition comprises:

A) 65 to 93% by weight of a liquid, blocked diisocyanate,

B) 2 to 15% by weight of a liquid diamine, liquid polyamine, or a mixture thereof, C) 0 to 25% by weight of pigments, fillers, or a mixture thereof, D) 0 to 20% by weight of one or more reactive diluents, and E) 0 to 8% by weight of auxiliaries and additives, where the sum of the proportions by weight of the components A to E is 100% by weight in each case.

2. The process as claimed in claim 1 wherein the sealing composition comprises:

A) 70 to 90% by weight of a liquid, blocked diisocyanate,

B) 6 to 12% by weight of a liquid diamine, liquid polyamine, or a mixture thereof, C) 0 to 20% by weight of pigments, fillers, or a mixture thereof, D) 0 to 10% by weight of one or more reactive diluents, and E) 0 to 8% by weight of auxiliaries and additives, where the sum of the proportions by weight of the components A to E is 100% by weight in each case.

3. The process as claimed in claim 1 wherein the component A used is a blocked toluylene diisocyanate.

4. The process as claimed in claim 1 wherein the component A used is an epsilon-caprolactam-blocked diisocyanate.

5. The process as claimed in claim 1 wherein the component B used is 4,4-diamino-3,3-dimethyldicyclohexylmethane, polyoxypropylenetriamine with an average molecular weight $M_w$ of 400–450, or a mixture thereof.

6. The process as claimed in claim 1 wherein the closure is first coated with a paint before the sealing composition is applied and stoved.

7. A packaging container with a closure, the inside of which has been coated and stoved with a sealing composition, wherein the sealing composition comprises:

A) 65 to 93% by weight of a liquid, blocked diisocyanate,

B) 2 to 15% by weight of a liquid diamine, liquid polyamine., or a mixture thereof, C) 0 to 25% by weight of pigments, fillers, or a mixture thereof, D) 0 to 20% by weight of one or more reactive diluents, and E) 0 to 8% by weight of auxiliaries and additives, where the sum of the proportions by weight of the components A to E is 100% by weight in each case.

8. The packaging container as claimed in claim 7, wherein the sealing composition comprises:
   A) 70 to 90% by weight of a liquid, blocked diisocyanate,
   B) 6 to 12% by weight of a liquid diamine, liquid polyamine, or a mixture thereof,
   C) 0 to 20% by weight of pigments, fillers, or a mixture thereof,
   D) 0 to 10% by weight of one or more reactive diluents, and
   E) 0 to 8% by weight of auxiliaries and additives, where the sum of the proportions by weight of the components A to E is 100% by weight in each case.

9. The packaging container as claimed in claim 7, wherein the component A used is a blocked toluylene diisocyanate.

10. The packaging container as claimed in claim 7, wherein the component A used is an epsilon-caprolactam-blocked diisocyanate.

11. The packaging container as claimed in claim 7 wherein the component B used is 4,4-diamino-3,3-dimethyldicyclohexylmethane, polyoxypropylenetriamine with an average molecular weight $M_w$ of 400–450, or a mixture thereof.

12. The packaging container as claimed in claim 7, wherein the closure is first coated with a paint before the sealing composition is applied and stoved.

13. A closure for packaging containers which has been prepared by a process as claimed in claim 1.

* * * * *